(12) United States Patent
Furutani

(10) Patent No.: US 10,384,410 B2
(45) Date of Patent: Aug. 20, 2019

(54) TIRE VULCANIZATION MOLD

(71) Applicant: TOYO TIRE & RUBBER CO., LTD., Itami-shi, Hyogo (JP)

(72) Inventor: Hiroyuki Furutani, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 40 days.

(21) Appl. No.: 15/855,147

(22) Filed: Dec. 27, 2017

(65) Prior Publication Data

US 2018/0207892 A1 Jul. 26, 2018

(30) Foreign Application Priority Data

Jan. 24, 2017 (JP) .................................. 2017-010636

(51) Int. Cl.
*B29D 30/06* (2006.01)

(52) U.S. Cl.
CPC .. B29D 30/0606 (2013.01); *B29D 2030/0607* (2013.01); *B29D 2030/0675* (2013.01); *B29D 2030/0677* (2013.01)

(58) Field of Classification Search
CPC ........ B29D 30/0606; B29D 2030/0607; B29D 2030/0677
USPC .......................................................... 425/36
See application file for complete search history.

(56) References Cited

U.S. PATENT DOCUMENTS 3,443,280 A * 5/1969 Hugger .............. B29D 30/0601
264/40.5
4,368,015 A * 1/1983 Kawahara .......... B29D 30/0645
425/143

FOREIGN PATENT DOCUMENTS

JP 2008-23880 A 2/2008

* cited by examiner

*Primary Examiner* — James P Mackey
(74) *Attorney, Agent, or Firm* — Westerman, Hattori, Daniels & Adrian, LLP

(57) ABSTRACT

Provided is a tire vulcanization mold including an upper side plate and a lower side plate configured to mold tire side portions, an upper bead ring and a lower bead ring respectively having a profile surface configured to mold a bead portion and a non-profile surface positioned on an inner diameter side of the profile surface, and a thermocouple pullout passage configured to make the non-profile surface and an inner space positioned on an inner diameter side of the lower bead ring communicate with each other and to pull out a vulcanization temperature measuring thermocouple, wherein a first passage extending from the non-profile surface to a lower side plate side is formed in the lower bead ring, and at least a portion of the thermocouple pullout passage is configured by the first passage.

7 Claims, 6 Drawing Sheets

TIRE VULCANIZATION MOLD

CROSS-REFERENCE TO RELATED APPLICATIONS

This application claims priority of Japanese Patent Application No.: 2017-010636 filed on Jan. 24, 2017, the content of which is incorporated herein by reference.

BACKGROUND OF THE INVENTION

Technical Field

The present invention relates to a tire vulcanization mold.

Related Art

In a tire vulcanization molding process, it is necessary to properly set vulcanization conditions such as a vulcanization temperature and a vulcanization time for respective kinds of tires. To this end, conventionally, temperatures of respective portions of a green tire during vulcanization molding are measured at the time of newly making a tire vulcanization mold or at the time of repairing a tire vulcanization mold, and optimum vulcanization conditions are set based on this heat history.

For example, JP 2008-023880 A discloses a configuration where a penetration hole portion which vertically penetrates is formed in a lower mold which molds a tire side portion. A thermocouple pullout passage through which a thermocouple adhered to a green tire, for measuring vulcanization temperature, is pulled out to the outside from the inside of the mold is configured by the penetration hole portion. After the vulcanization conditions are fixed, in a normal manufacturing time, the penetration hole portion is closed by a plug (for example, a set screw).

The penetration hole portion is formed perpendicular to a profile surface for molding the tire side portion. With such a configuration, in a normal manufacturing time, the plug which closes the penetration hole portion can be arranged substantially coplanar with the profile surface thus suppressing unevenness on the profile surface. Further, in a vulcanization molding apparatus, the tire vulcanization mold is supported on a container.

SUMMARY

FIG. 9 shows a thermocouple pullout passage 110 formed on a lower mold 101 of a tire vulcanization mold 100 according to a conventional example. As shown in FIG. 9, the mold 101 is supported on a lower container 102 from below. Accordingly, to avoid the lower container 102, the thermocouple pullout passage 110 includes: a first passage 111 which has one end portion thereof communicated with a profile surface 101a and extends downward; and a second passage 112 which makes a lower end portion of the first passage 111 and a side end surface 101b of a lower portion of the mold 101 communicate with each other.

That is, the thermocouple pullout passage 110 is routed around from the profile surface 101a to the side end surface 101b in the mold 101 so that the thermocouple pullout passage 110 is considerably elongated. Further, the first passage 111 extends perpendicular to the profile surface 101a (substantially vertically), and the second passage 112 extends substantially horizontally. With such a configuration, the thermocouple pullout passage 110 is bent at an approximately right angle at a connecting portion between the first passage 111 and the second passage 112. Accordingly, in the conventional thermocouple pullout passage 110, the passage is liable to be considerably elongated and is bent at an approximately right angle and hence, it is not an easy operation to insert a thermocouple 120 into the thermocouple pullout passage 110 and to pull out the thermocouple 120 from the inside to the outside of the mold.

Accordingly, it is an object of the present invention to provide a tire vulcanization mold where a vulcanization temperature measuring thermocouple which is adhered to a green tire can be easily pulled out from the inside to the outside of the mold.

According to an aspect of the present invention, there is provided a tire vulcanization mold including: a pair of upper and lower side plates configured to mold tire side portions; a pair of upper and lower bead rings fixedly mounted on the side plates from the inside in a tire width direction, the bead rings having a profile surface configured to mold a bead portion and a non-profile surface positioned on an inner diameter side of the profile surface; and a thermocouple pullout passage configured to make the non-profile surface and an inner space positioned on an inner diameter side of the bead ring communicate with each other and to pull out a vulcanization temperature measuring thermocouple, wherein a first passage extending from the non-profile surface to a side plate side is formed in at least one of the bead rings, and at least a portion of the thermocouple pullout passage is configured by the first passage.

According to the present invention, the thermocouple pullout passage is configured such that the non-profile surface and the inner space positioned on the inner diameter side of the bead ring communicate with each other by way of the first passage formed in the bead ring. In this manner, by forming the thermocouple pullout passage such that the mold inner surface side of the bead ring communicates with the end surface on the inner diameter side disposed close to the mold inner surface side, the thermocouple pullout passage having a short distance can be formed. Accordingly, operability of pulling out a thermocouple can be improved.

The first passage is formed on the non-profile surface and hence, it is possible to prevent rubber from leaking out from the first passage during vulcanization molding.

It is preferable that the first passage extends toward a side plate side while being inclined toward an inner space side.

With such a configuration, the first passage extends toward the side plate side while being inclined toward the inner space side and hence, the thermocouple pullout passage can be made even shorter and, at the same time, the degree of bending of the thermocouple pullout passage toward the inside in a tire radial direction can be made gentler. Accordingly, operability of pulling out a thermocouple can be further improved.

It is preferable that the upper side plate be configured to be vertically movable, the lower side plate be configured to be vertically not movable, and at least a portion of the thermocouple pullout passage be formed in the lower bead ring.

With such a configuration, the thermocouple can be pulled out from the lower bead ring on the non-movable side and hence, the green tire to which the thermocouple is adhered can be easily mounted on the tire vulcanization mold. Further, the thermocouple is not configured to be pulled out from the upper bead ring on a movable portion side and hence, there is no possibility that the thermocouple is pulled out by the movable upper bead ring so that disconnection of the thermocouple can be prevented.

It is preferable that the tire vulcanization mold further includes: a threaded hole portion formed on the non-profile surface at a position where the first passage is formed, the threaded hole portion extending in a direction orthogonal to the non-profile surface and having a counter bore portion on a mouth thereof; and a fastening member fastened and fixed to the threaded hole portion, wherein the fastening member be set in the counter bore portion such that a head portion of the fastening member becomes substantially coplanar with the non-profile surface.

With such a configuration, when the temperature measurement is not performed, that is, in a normal manufacturing time, an opening portion of the first passage on the non-profile surface can be closed by fastening and fixing the fastening member to the threaded hole portion. Further, the fastening member is set in the counter bore portion such that the head portion of the fastening member becomes substantially coplanar with the non-profile surface and hence, unevenness on the non-profile surface can be suppressed. Accordingly, a bladder can be expanded and contracted while preventing the bladder from being caught by the non-profile surface and hence, breaking of the bladder can be prevented.

It is preferable that the tire vulcanization mold further includes a second passage on an inner-diameter-side end portion of the side plate, the second passage positioned corresponding to the first passage and communicating with the inner space, wherein a portion of the thermocouple pullout passage is configured by the second passage.

With such a configuration, the thermocouple pulled out from the first passage can be pulled out to the inner space through the second passage. By forming a latter half portion (a downstream side portion in a pullout direction) of the thermocouple pullout passage by the second passage formed in the side plate, the thermocouple pullout passage can be elongated in the vertical direction (tire width direction) compared to a case where the thermocouple pullout passage is formed only in the bead ring. Accordingly, the thermocouple pullout passage can be easily formed in a gentler manner while suppressing bending of the thermocouple pullout passage and hence, operability of pulling out a thermocouple can be further improved.

It is preferable that a width of the second passage be larger than a width of the first passage as viewed in a plan view.

With such a configuration, in a connecting portion from the first passage to the second passage, there is no possibility that a groove wall portion which forms the second passage becomes a stepped portion and projects into the inside of the thermocouple pullout passage. Accordingly, the thermocouple pulled out from the first passage can be pulled into the second passage without being caught by the connecting portion. Accordingly, operability of pulling out a thermocouple can be further improved.

It is preferable that the upper side plate have a first positioning pin, a first positioning hole into which the first positioning pin is fitted be formed in the upper bead ring, the lower side plate have a second positioning pin, a second positioning hole into which the second positioning pin is fitted be formed in the lower bead ring, and the first positioning pin and the second positioning pin be disposed at different positions in a radial direction.

With such a configuration, the bead ring can be positioned and fixed to the side plate which corresponds to the bead ring. Accordingly, it is possible to easily make the first passage formed in the bead ring and the second passage formed in the side plate communicate with each other. Further, the first positioning pin of the upper side plate and the second positioning pin of the lower side plate are disposed at different positions in a radial direction. Accordingly, it is possible to prevent the occurrence of a case where the pair of upper and lower bead rings is erroneously assembled to the side plates which are disposed upside down. As a result, operability of assembling a bead ring can be improved.

According to the tire vulcanization mold of the present invention, the vulcanization temperature measuring thermocouple can be easily pulled out to the outside from the inside of the mold.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, embodiments of the present invention are described with reference to attached drawings. The description made hereinafter merely shows an example essentially, and does not intend to limit the present invention, products to which the present invention is applied, or its applications. Further, drawings are schematically shown and hence, ratios of respective distances and the like may differ from actual ratios of distances and the like.

First Embodiment

Figure 1:
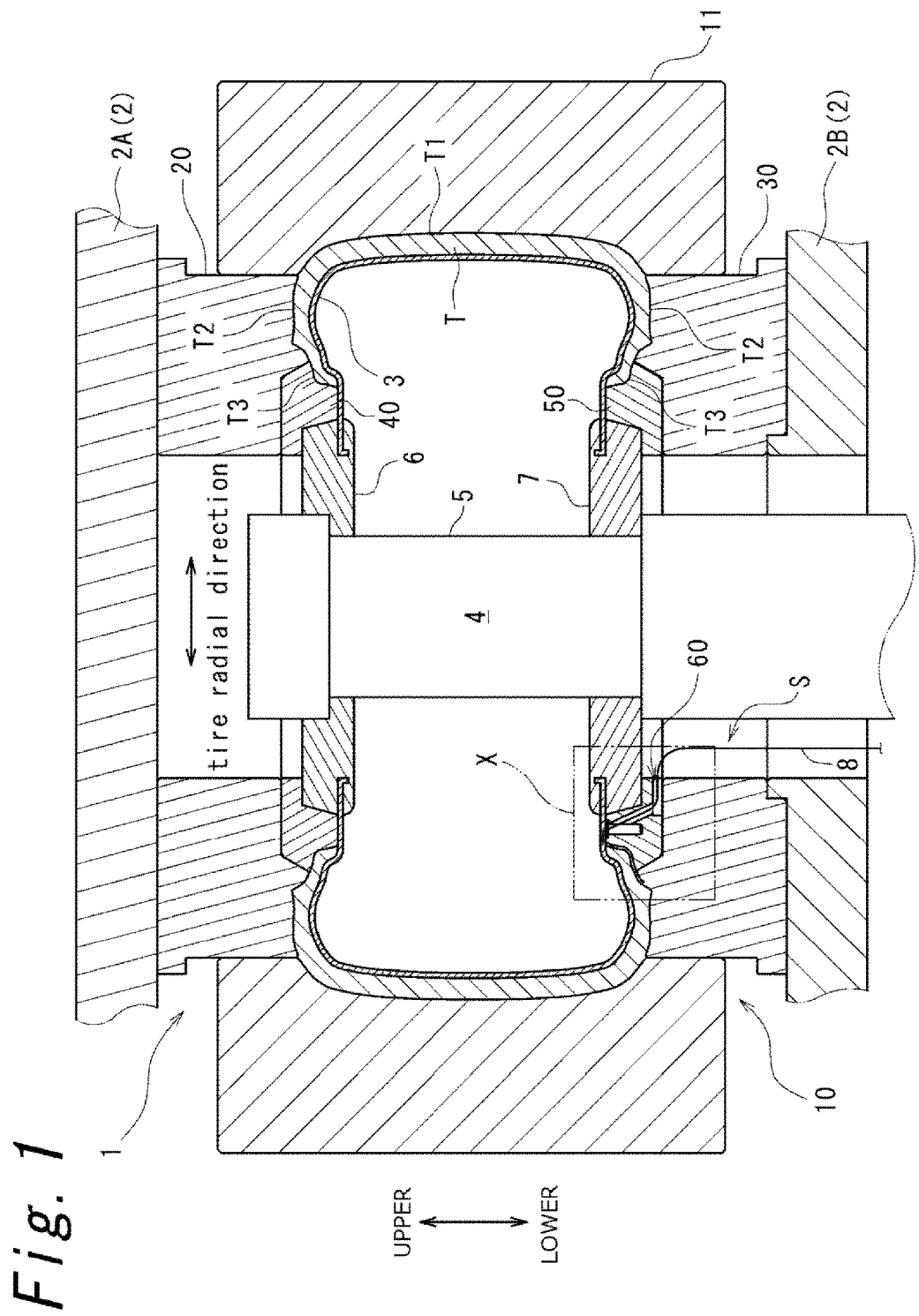
FIG. 1 is a cross-sectional front view showing a tire vulcanization device according to a first embodiment of the present invention.

As schematically shown in FIG. 1, a tire vulcanization device 1 according to a first embodiment of the present invention includes: a tire vulcanization mold 10 configured to vulcanization mold a green tire T into a predetermined shape; a container 2 housing and holding the tire vulcanization mold 10 in the inside thereof; a bladder 3 pressing the green tire T to the tire vulcanization mold 10 from the inside; and a center mechanism 4 disposed at a center portion of the tire vulcanization mold 10 and supporting the bladder 3. In the tire vulcanization mold 10, the green tire T is set such that a tire axis is directed in a vertical direction.

The tire vulcanization mold 10 includes: an annular tread ring 11 configured to mold a tread portion T1 of the green tire T; a pair of an upper side plate 20 and a lower side plate 30 configured to mold the tire side portions T2; and a pair of an upper bead ring 40 and a lower bead ring 50 configured to mold bead portions T3.

Although not shown in the drawing, the tread ring 11 is divided into a plurality of sectors in a tire circumferential direction, and the respective sectors are configured to be displaceable in an expandable and shrinkable manner in a tire radial direction when the tire vulcanization mold 10 is opened or closed. The respective sectors are spaced apart from each other radially in a mold open state, and are brought into contact with each other thus forming the annular tread ring 11 in a mold closed state. That is, the tire vulcanization mold 10 is configured as a so-called segmented mold.

The upper bead ring 40 is fixed to an inner side portion of the upper side plate 20 in a tire radial direction from the inside (lower side) in a tire width direction by fastening members (not shown in the drawing). The lower bead ring 50 is fixed to an inner side portion of the lower side plate 30 in a tire radial direction from the inside (upper side) in a tire width direction by fastening members (not shown in the drawing).

The container 2 supports the tire vulcanization mold 10. Further, the container 2 includes a platen board having a heat source such as an electric heater or a steam jacket, for example. Accordingly, the tire vulcanization mold 10 is heated by the heat source during vulcanization molding. In FIG. 1, an upper container 2A which supports the upper side plate 20 from above, and a lower container 2B which supports the lower side plate 30 from below are shown. Containers which support the respective sectors of the tread ring 11 are not shown in the drawings.

In the tire vulcanization mold 10, while the upper side plate 20 is configured to be vertically movable, the lower side plate 30 is configured to be vertically not movable. That is, in the tire vulcanization mold 10, in an open state where the upper side plate 20 is moved upward, the green tire T can be mounted and a pneumatic tire can be taken out after vulcanization, while in a closed state where the upper side plate 20 is moved downward, vulcanization molding of the green tire T can be performed.

The center mechanism 4 has a center post 5 extending in a vertical direction at a center portion of the tire vulcanization mold 10, and an upper clamp 6 supporting an upper end portion of the bladder 3 and a lower clamp 7 supporting a lower end portion of the bladder 3 are mounted on the center post 5. With the use of the center post 5, vulcanization molding of the green tire T can be performed by supplying a heated medium into the bladder 3 thus inflating the bladder 3, while the green tire T can be mounted on the tire vulcanization mold 10 and a vulcanization molded tire can be removed from the tire vulcanization mold 10 by discharging the heated medium from the bladder 3 thus shrinking the bladder 3.

The center post 5 is positioned in the inside in a tire radial direction with respect to the tire vulcanization mold 10 in a spaced-apart manner. That is, in the inside of the lower side plate 30 and the lower bead ring 50 in a radial direction, a doughnut-shaped inner space S is defined around the center post 5.

The tire vulcanization mold 10 of this embodiment includes a thermocouple pullout passage 60 for pulling out one or a plurality of thermocouples 8 adhered to respective portions of the green tire T to the outside from the tire vulcanization mold 10. By connecting the thermocouples 8 pulled out from the thermocouple pullout passage 60 to a measuring instrument (not shown in the drawing), temperatures of the respective portions of the green tire T during vulcanization molding can be measured.

Hereinafter, the thermocouple pullout passage 60 is described more specifically.

Figure 2:
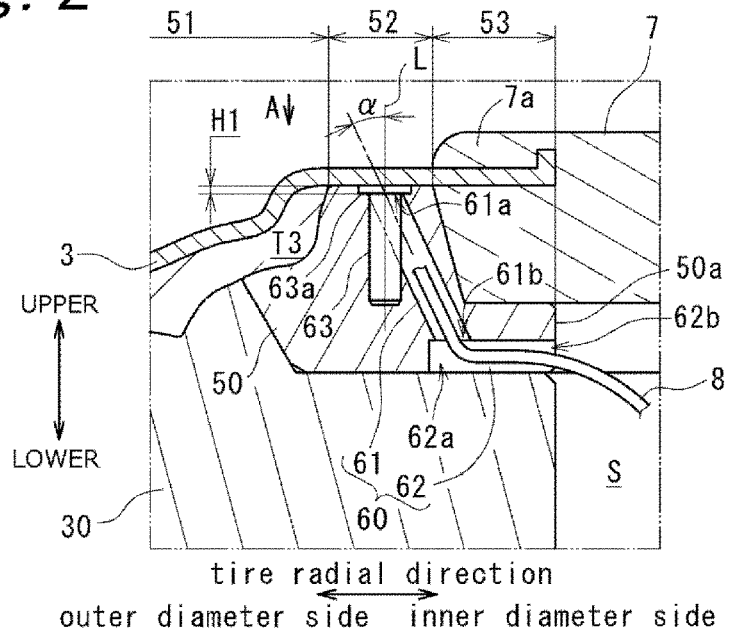
FIG. 2 is a cross-sectional view of a main part where an X part in FIG. 1 is shown in an enlarged manner.

FIG. 2 is a view showing an X part in FIG. 1 in an enlarged manner, and shows a periphery of the lower side plate 30 and a periphery of the lower bead ring 50. As shown in FIG. 2, the lower bead ring 50 has: a profile surface 51 configured to mold a bead portion T3 of the green tire T; and a non-profile surface 52 positioned on an inner diameter side of the profile surface 51 in a tire radial direction.

On an inner-diameter-side portion of the lower bead ring 50, a stepped portion 53 which steps down toward the outside in a tire width direction by one stage is formed. The stepped portion 53 is formed such that an outer-diameter-side portion 7a of the lower clamp 7 is positioned corresponding to the stepped portion 53 from an upper side (an inner side in a tire width direction) during vulcanization molding.

In this embodiment, the thermocouple pullout passage 60 is formed in the lower bead ring 50 such that the non-profile surface 52 and the inner space S positioned on an inner diameter side of the lower bead ring 50 are made to communicate with each other by the thermocouple pullout passage 60. To be more specific, the thermocouple pullout passage 60 has: a first passage 61 which is formed in the lower bead ring 50 in a penetrating manner and extends downward from the non-profile surface 52 and reaches a lower side plate 30 side; and a second passage 62 which extends toward an inner diameter side in a tire radial direction and makes the first passage 61 and the inner space S communicate with each other.

The first passage 61 is formed of a linear hole having a circular cross section, extends downward in an inclined manner toward an inner diameter side in a tire radial direction at an inclination angle α with respect to a vertical line L perpendicular to the non-profile surface 52. The inclination angle α is suitably set such that the first passage 61 does not open in the stepped portion 53 so that the stepped portion 53 has a predetermined wall thickness. The second passage 62 is formed of a groove portion where a side of the second passage 62 on a lower-side-plate 30 side is opened. An outer-diameter-side end portion 62a of the second passage 62 communicates with a lower end portion of the first passage 61, and an inner-diameter-side end portion 62b of the second passage 62 communicates with an inner-diameter-side end surface 50a of the lower bead ring 50.

Figure 3:
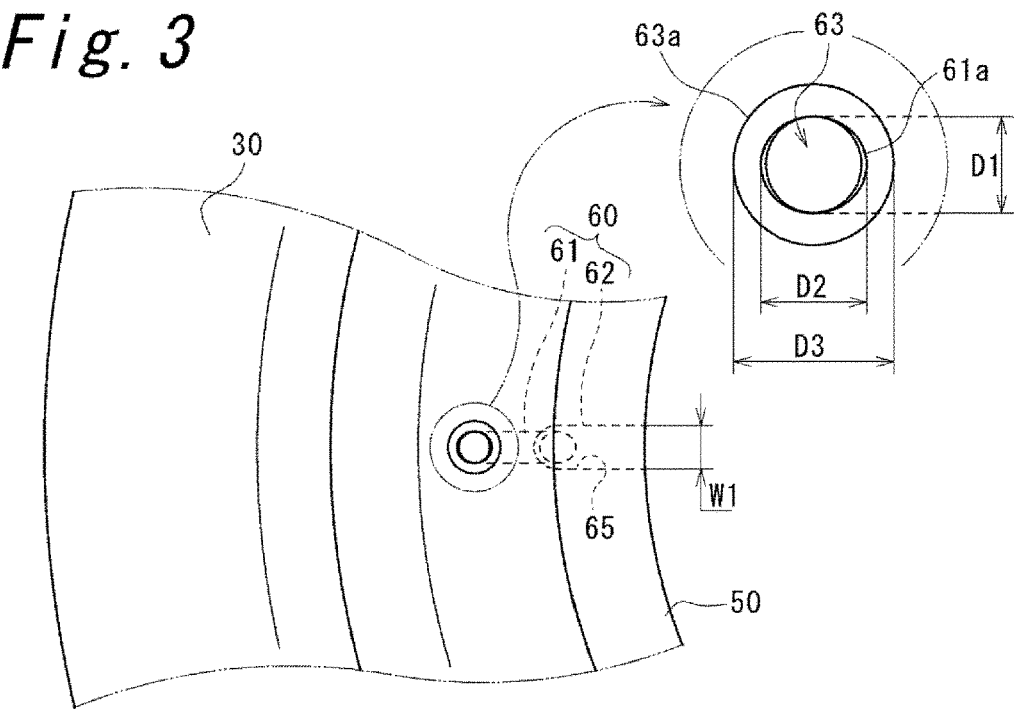
FIG. 3 is a plan view of a side plate and a bead ring as viewed in a direction of an arrow A in FIG. 2.

FIG. 3 is a plan view of the lower side plate 30 and the lower bead ring 50 as viewed in a direction of an arrow A in FIG. 2. As shown in FIG. 3, a hole diameter D1 of the first passage 61 is set to a size which allows the insertion of a plurality of thermocouples 8, for example, 4 mm or more and 8 mm or less. On the other hand, a groove width W1 of the second passage 62 is set larger than the hole diameter D1 of the first passage 61, for example, 10 mm. Further, in the plan view shown in FIG. 3, the first passage 61 and the second passage 62 are arranged such that the center axes of the first passage 61 and the second passage 62 substantially agree with each other. Accordingly, at a connecting portion where the first passage 61 is connected to the second passage 62, there is no possibility that a groove wall portion 65 which forms the second passage 62 forms a stepped portion and projects toward the inside of the first passage 61.

Figure 4:
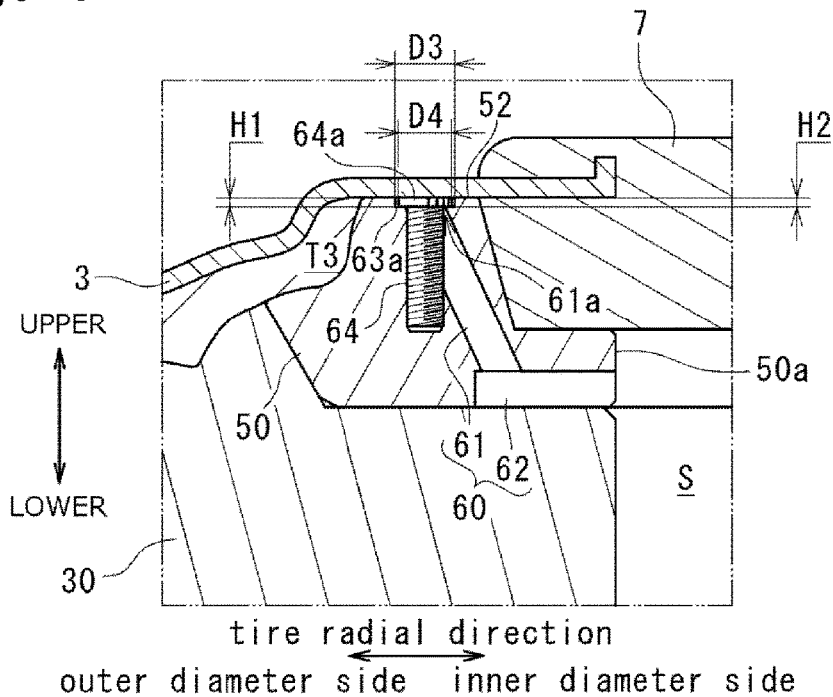
FIG. 4 is a cross-sectional view of a main part substantially equal to FIG. 2 where a state in which a thermocouple pullout passage is sealed is shown.

Returning to FIG. 2, a threaded hole portion 63 extending on the vertical line L is formed on the non-profile surface 52 at a position where the first passage 61 is formed. As shown in FIG. 4, in a state where a fastening member 64 (for example, a flat countersunk head screw) is fastened and fixed to the threaded hole portion 63, an entrance opening portion 61a of the first passage 61 on the non-profile surface 52 is closed by a head portion 64a of the fastening member 64. That is, when a temperature of the green tire T is not measured, that is, in a normal manufacturing time, the fastening member 64 is mounted on the threaded hole portion 63.

The threaded hole portion 63 has a counter bore portion 63a on a mouth thereof. The head portion 64a of the fastening member 64 fastened and fixed to the threaded hole portion 63 is set in the counter bore portion 63a such that the head portion 64a becomes substantially coplanar with the non-profile surface 52. That is, a counter bore depth H1 of the counter bore portion 63a is set equal to a height H2 of the head portion 64a of the fastening member 64.

The first passage 61 is inclined toward an inner diameter side in a tire radial direction and hence, as shown in FIG. 3, the entrance opening portion 61a positioned on a non-profile surface 52 side is formed in an elliptical shape extending in a tire radial direction. A minor axis of the entrance opening portion 61a is equal to a hole diameter D1 of the first passage 61, and a major axis D2 of the entrance opening portion 61a is longer than the hole diameter D1. A counter bore diameter D3 of the counter bore portion 63a is set larger than the major axis D2 of the entrance opening portion 61a. Further, a diameter D4 of the head portion 64a of the fastening member (FIG. 4) is also larger than the major axis D2 of the entrance opening portion 61a, and is set substantially equal to the counter bore diameter D3. With such a configuration, the entrance opening portion 61a of the first passage 61 is closed by the head portion 64a of the fastening member 64 fastened and fixed to the threaded hole portion 63.

Accordingly, when a temperature is measured during vulcanization molding, as shown in FIG. 2, in a state where the fastening member 64 is removed from the threaded hole portion 63, the plurality of thermocouples 8 adhered to the green tire T can be pulled out to the inner space S side through the thermocouple pullout passage 60. Further, in a normal manufacturing time, as shown in FIG. 4, an opening portion of the thermocouple pullout passage 60 on a mold inner surface side is closed by fastening and fixing the fastening member 64 to the threaded hole portion 63.

According to the first embodiment described above, it is possible to acquire the following advantageous effects.

(1) The thermocouple pullout passage 60 is configured such that the non-profile surface 52 and the inner space S positioned on the inner diameter side of the lower bead ring 50 communicate with each other by way of the first passage 61 and the second passage 62 formed in the lower bead ring 50. In this manner, by forming the thermocouple pullout passage 60 such that the non-profile surface 52 side of the bead ring 50 communicates with the end surface 50a on the inner diameter side disposed close to the non-profile surface side 52, the thermocouple pullout passage 60 having a short distance can be formed. Accordingly, operability of pulling out the thermocouple 8 can be improved.

The first passage 61 is formed on the non-profile surface 52 and hence, it is possible to prevent rubber from leaking out from the first passage 61 during vulcanization molding.

(2) The first passage 61 extends toward the lower side plate side 30 while being inclined toward the inner space S side and hence, the thermocouple pullout passage 60 can be made even shorter and, at the same time, the degree of bending of the thermocouple pullout passage 60 toward the inside in a tire radial direction can be made gentler. Accordingly, operability of pulling out the thermocouple 8 can be further improved.

(3) The thermocouple 8 can be pulled out from the lower bead ring 50 which is not moved in a mold fastening operation or the like and hence, the green tire T to which the thermocouple 8 is adhered can be easily mounted on the tire vulcanization mold 10 while pulling out the thermocouple 8 to the outside of the tire vulcanization mold 10. Further, the thermocouple 8 is not pulled out from the upper bead ring 40 which is configured vertically movable and hence, there is no possibility that the thermocouple 8 is pulled out due to the movement of the upper bead ring 40 so that disconnection of the thermocouple 8 can be prevented.

(4) In a normal manufacturing time, the entrance opening portion 61a of the first passage 61 on the non-profile surface 52 can be closed by fastening and fixing the fastening member 64 to the threaded hole portion 63. Further, the fastening member 64 is set in the counter bore portion 63a such that the head portion 64a of the fastening member 64 becomes substantially coplanar with the non-profile surface 52 and hence, unevenness on the non-profile surface 52 can be suppressed. Accordingly, the bladder 3 can be expanded and contracted while preventing the bladder 3 from being caught by the non-profile surface 52 and hence, breaking of the bladder 3 can be prevented.

(5) In the connecting portion from the first passage 61 to the second passage 62, there is no possibility that the groove wall portion 65 which forms the second passage 62 becomes a stepped portion and projects into the inside of the thermocouple pullout passage 60. Accordingly, the thermocouple 8 pulled out from the first passage 61 can be pulled into the second passage 62 without being caught by the connecting portion. Accordingly, operability of pulling out the thermocouple 8 can be further improved.

Figure 5:
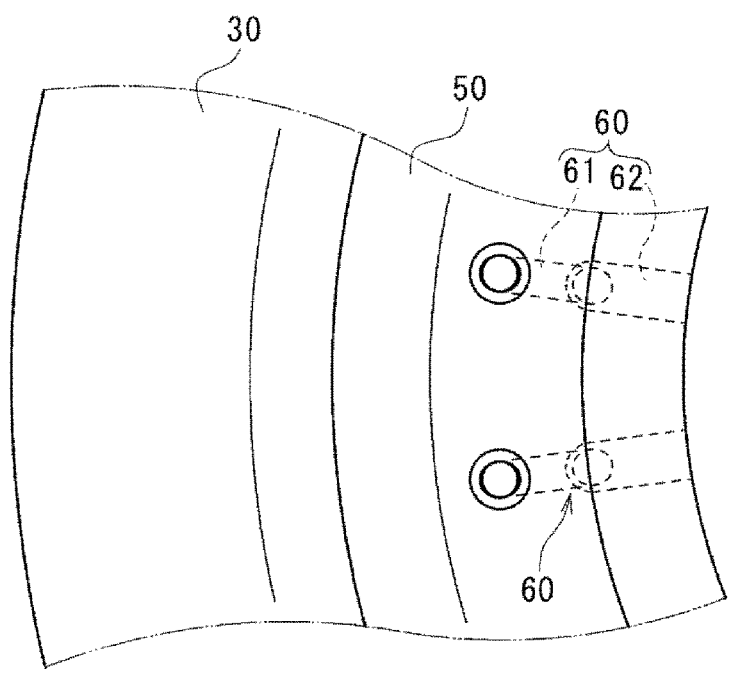
FIG. 5 is a plan view of a side plate and a bead ring in a tire vulcanization device according to a modification of the first embodiment of the present invention.

As shown in FIG. 5, a plurality of thermocouple pullout passages 60 may be formed by making phases of the thermocouple pullout passages 60 different from each other in a circumferential direction. With such a configuration, when a defect occurs in one thermocouple pullout passage 60, another thermocouple pullout passage 60 is used in place of one thermocouple pullout passage 60 and hence, time and effort necessary for repairing the bead ring 50 are obviated. As a defect which has a possibility of occurring in the thermocouple pullout passage 60, for example, fixing by seizure of the fastening member 64 or a damage on the threaded hole portion 63 due to repeated fastening of the fastening member 64 is named.

Second Embodiment

Figure 6:
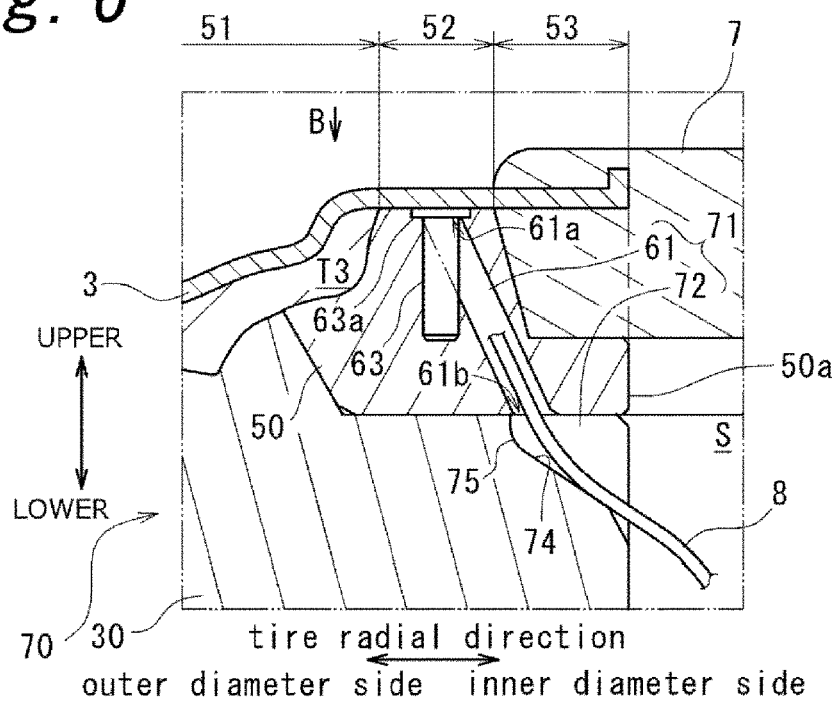
FIG. 6 is a cross-sectional view of a main part substantially equal to FIG. 2 where a thermocouple pullout passage according to a second embodiment is shown.
Figure 7:
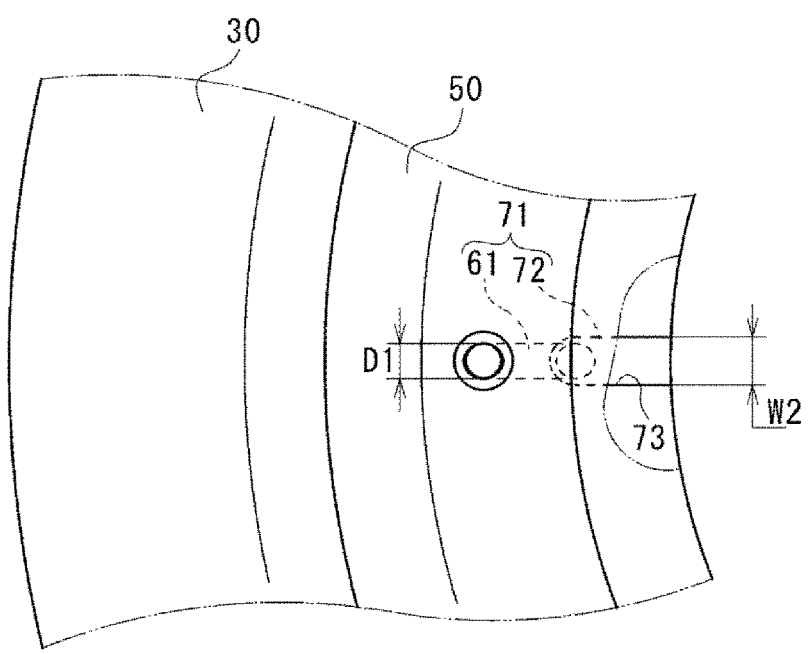
FIG. 7 is a plan view of a side plate and a bead ring as viewed in a direction of an arrow B in FIG. 6.

FIG. 6 and FIG. 7 show a tire vulcanization mold 70 according to a second embodiment. The tire vulcanization mold 70 has a thermocouple pullout passage 71 which differs from the thermocouple pullout passage 60 of the first embodiment. The tire vulcanization mold 70 has the same configuration as the tire vulcanization mold 10 of the first embodiment with respect to other constitutional elements. In the second embodiment, the constitutional elements of the tire vulcanization mold 70 identical to the constitutional elements of the tire vulcanization mold 10 in the first embodiment are given the same symbols and the repeated description of the overlapping constitutional elements is omitted.

FIG. 6 is a cross-sectional view of a main part of the tire vulcanization mold 70 in the same manner as FIG. 2, and FIG. 7 is a plan view in the same manner as FIG. 3. As shown in FIG. 6, a thermocouple pullout passage 71 includes a first passage 61 formed in a lower bead ring 50, and a second passage 72 formed in a lower side plate 30. That is, compared to the thermocouple pullout passage 60 in the first embodiment, in the thermocouple pullout passage in the second embodiment, the second passage 72 is formed in the lower side plate 30 in place of the second passage 62 formed in the lower bead ring 50 in the first embodiment.

On an inner-diameter-side end portion of the lower side plate 30, the second passage 72 is disposed at a position which corresponds to an exit opening portion 61b of the first passage 61 and communicates with an inner space S. To be more specific, as viewed in a plan view, a portion of the second passage 72 disposed at a position which corresponds to the exit opening portion 61b of the first passage 61 is formed on the lower side plate 30 as a groove-shaped notched portion such that the portion of the second passage 72 penetrates an inner-diameter-side end portion of the lower side plate 30 in a tire radial direction.

Also with reference to FIG. 7, as viewed in a plan view, a groove width W2 of the second passage 72 is set larger than a hole diameter D1 of the first passage 61. The groove width W2 of the second passage 72 is set to 10 mm, for example. Further, the first passage 61 and the second passage 72 are arranged such that the center axes of these passages 61, 72 are substantially aligned with each other. Accordingly, there is no possibility that, in a connecting portion from the first passage 61 to the second passage 72, a groove wall portion 73 of the second passage 72 becomes a stepped portion and projects into the inside of the first passage 61.

As shown in FIG. 6, a groove bottom surface 74 of the second passage 72 extends downward toward an inner diameter side in a tire radial direction in an inclined manner. An upper portion of the groove bottom surface 74 is curved upward by way of a rounded portion 75, and is positioned on an outer diameter side of an exit opening portion 61b of the first passage 61 in a tire radial direction.

According to this embodiment, the thermocouple 8 pulled out from the first passage 61 formed in the lower bead ring 50 can be pulled out to the inner space S through the second passage 72 formed in the lower side plate 30. By forming a latter half portion of the thermocouple pullout passage 71 by the second passage 72 formed in the lower side plate 30, the thermocouple pullout passage 71 can be formed in an elongated manner in the vertical direction compared to the case where the thermocouple pullout passage 71 is formed only in the lower bead ring 50. With such a configuration, the thermocouple pullout passage 71 is formed such that the degree of bending of the thermocouple pullout passage 71 toward the inside in a tire radial direction can be made gentler. Accordingly, operability of pulling out the thermocouple 8 can be further improved.

Further, in the connecting portion from the first passage 61 to the second passage 72, there is no possibility that the groove wall portion 73 which forms the second passage 72 becomes a stepped portion and projects into the inside of the thermocouple pullout passage 71. Accordingly, the thermocouple 8 pulled out from the first passage 61 can be pulled into the second passage 72 without being caught by the connecting portion. Accordingly, operability of pulling out the thermocouple 8 can be further improved.

A groove bottom surface 74 of the second passage 72 extends downward toward an inner diameter side in a tire radial direction in an inclined manner, and a connecting portion of the second passage 72 with the first passage 61 is curved upward by way of a rounded portion. Accordingly, the thermocouple 8 pulled out from the first passage 61 can be pulled into the second passage 72 more gently while preventing the thermocouple 8 from being caught by the connecting portion.

Third Embodiment

Figure 8:
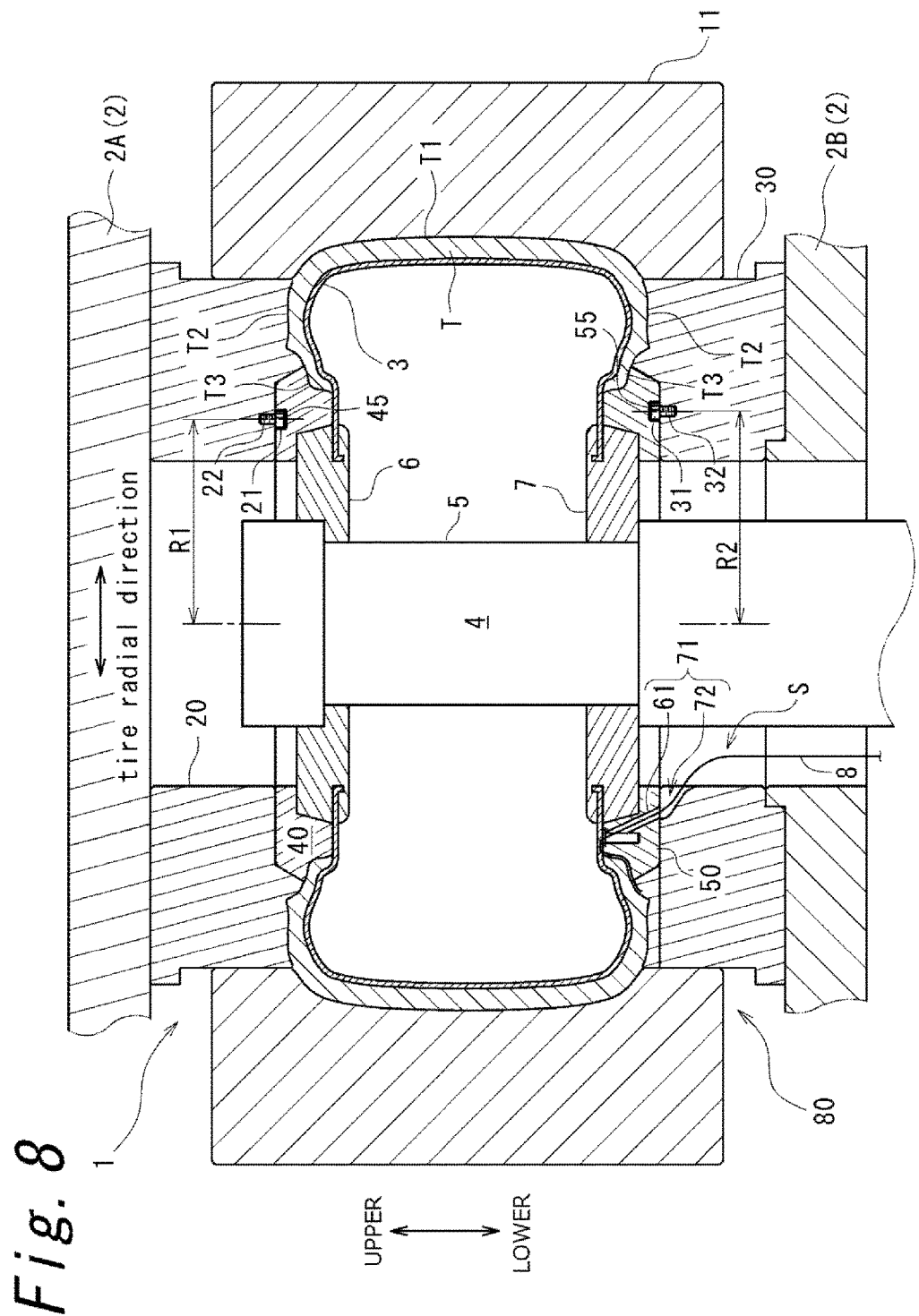
FIG. 8 is a cross-sectional front view showing a tire vulcanization device according to a third embodiment of the present invention.
Figure 9:
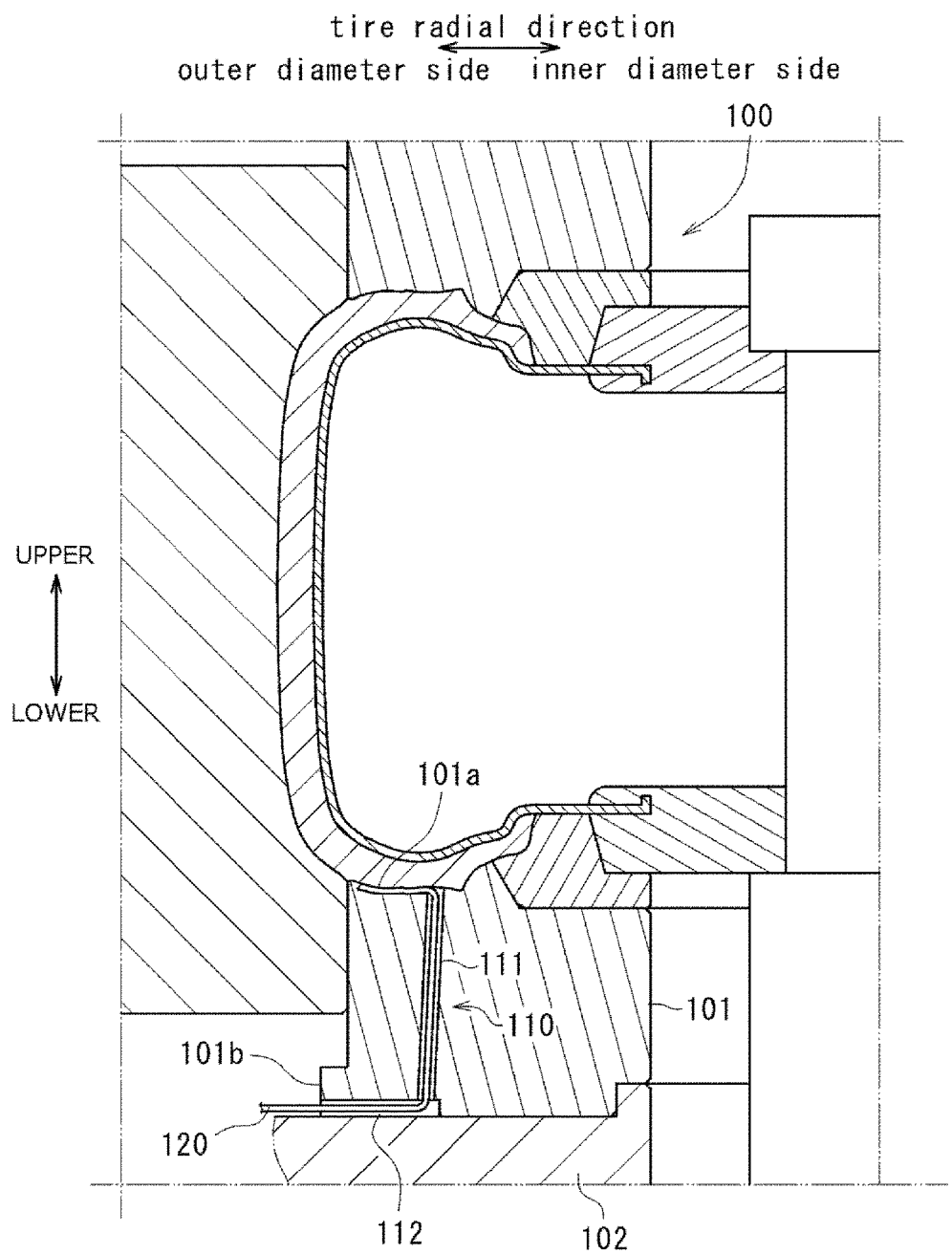
FIG. 9 is a cross-sectional front view showing a conventional tire vulcanization device.

FIG. 8 shows a tire vulcanization mold 80 according to a third embodiment. The tire vulcanization mold 80 differs from the tire vulcanization mold 70 according to the second embodiment with respect to a point that a pair of upper and lower bead rings 40, 50 is positioned with respect to a pair of corresponding upper and lower side plates 20, 30. The tire vulcanization mold 80 has the same configuration as the tire vulcanization mold 70 of the second embodiment with respect to other. In the third embodiment, the constitutional elements of the tire vulcanization mold 80 identical to the constitutional elements of the tire vulcanization molds 10, 70 in the first and second embodiments are given the same symbols and the repeated description of the overlapping constitutional elements is omitted.

As shown in FIG. 8, a first positioning pin 21 for positioning the upper bead ring 40 is mounted on a lower surface of the upper side plate 20 in a downwardly projecting manner. The first positioning pin 21 is formed of a head portion of the fastening member 22 fastened and fixed to the upper side plate 20 from a lower side, and the first positioning pin 21 is positioned at a distance of a radius R1 from the center of the tire vulcanization mold 80. On the other hand, a first positioning hole 45 into which the first positioning pin 21 is fitted is formed in the upper bead ring 40. The first positioning hole 45 is positioned at a distance of a radius R1 from the center of the tire vulcanization mold 80.

In the same manner, a second positioning pin 31 for positioning the lower bead ring 50 is mounted on an upper surface of the lower side plate 30 in an upwardly projecting manner. The second positioning pin 31 is formed of a head portion of the fastening member 32 fastened and fixed to the lower side plate 30 from an upper side, and the second positioning pin 31 is positioned at a distance of a radius R2 from the center of the tire vulcanization mold 80. On the other hand, a second positioning hole 55 into which the second positioning pin 31 is fitted is formed in the lower bead ring 50. The second positioning hole 55 is positioned at a distance of a radius R2 from the center of the tire vulcanization mold 80.

In the third embodiment, the radius R1 and the radius R2 are set different from each other so that the first positioning pin 21 and the second positioning pin 31 differ from each other with respect to a position in a radial direction from the center of the tire vulcanization mold 80.

According to this embodiment, the upper bead ring 40 and the lower bead ring 50 can be respectively positioned and fixed to the upper side plate 20 and the lower side plate 30 which correspond to the upper bead ring 40 and the lower bead ring 50 respectively. As a result, it is possible to easily make the first passage 61 formed in the lower bead ring 50 and the second passage 72 formed in the lower side plate 30 communicate with each other.

Further, the first positioning pin 21 and the second positioning pin 31 are disposed at different positions in a radial direction. Accordingly, it is possible to prevent the occurrence of a case where the upper bead ring 40 and the lower bead ring 50 are erroneously assembled respectively to the lower side plate 30 and the upper side plate 20 which are disposed upside down. As a result, operability of assembling a bead rings can be improved.

The third embodiment may be combined with the first embodiment. With such a configuration, it is possible to prevent the lower bead ring 50 from being erroneously assembled to the upper side plate 20, and the thermocouple 8 can be pulled out from the lower bead ring 50 on a non-movable portion side.

In the above-mentioned respective embodiments, the first passage 61 is inclined at an inclination angle α with respect to the line L perpendicular to the non-profile surface 52. However, the present invention is not limited to such a case. That is, the first passage 61 may be formed perpendicular to the non-profile surface 52. Also in such a case, it is sufficient that a lower end portion of the first passage 61 be made to communicate with the inner space S by the second passage 62 or the second passage 72 thus shortening the thermocouple pullout passage.

In the above-mentioned respective embodiments, the second passage 62 and the second passage 72 are respectively formed of the groove portion. However, the present invention is not limited to such a case. That is, the second passage 62 and the second passage 72 may be formed of a hole portion.

In the above-mentioned embodiments, the description has been made by taking the case where the tread ring 11 is the segmented mold having the plurality of divided sectors in a tire circumferential direction. However, the present invention is not limited to this case. That is, the present invention is also preferably applicable to a so-called two-piece mold which is formed of an upper mold and a lower mold. In this case, the lower side plate 30 and the lower bead ring 50 of the present invention can be carried out by being exchanged with respective corresponding portions of the lower mold.

The present invention is not limited to the configuration described in the embodiments and various modifications of the present invention are conceivable.

What is claimed is:

1. A tire vulcanization mold comprising:
    a pair of upper and lower side plates configured to mold tire side portions;
    a pair of upper and lower bead rings fixedly mounted on the side plates from the inside in a tire width direction, the bead rings having a profile surface configured to mold a bead portion and a non-profile surface positioned on an inner diameter side of the profile surface; and
    a thermocouple pullout passage configured to make the non-profile surface and an inner space positioned on an inner diameter side of the bead ring communicate with each other and to pull out a vulcanization temperature measuring thermocouple, wherein
    a first passage extending from the non-profile surface to a side plate side is formed in at least one of the bead rings, and at least a portion of the thermocouple pullout passage is configured by the first passage.

2. The tire vulcanization mold according to claim 1, wherein the first passage extends toward a side plate side while being inclined toward an inner space side.

3. The tire vulcanization mold according to claim 1, wherein the upper side plate is configured to be vertically movable, the lower side plate is configured to be vertically not movable, and at least a portion of the thermocouple pullout passage is formed in the lower bead ring.

4. The tire vulcanization mold according to claim 1 further comprising:
    a threaded hole portion formed on the non-profile surface at a position where the first passage is formed, the threaded hole portion extending in a direction orthogonal to the non-profile surface and having a counter bore portion on a mouth thereof; and
    a fastening member fastened and fixed to the threaded hole portion, wherein
    the fastening member is set in the counter bore portion such that a head portion of the fastening member becomes substantially coplanar with the non-profile surface.

5. The tire vulcanization mold according to claim 1 further comprising:
    a second passage formed on an inner-diameter-side end portion of the side plate, the second passage positioned corresponding to the first passage and communicating with the inner space, wherein
    a portion of the thermocouple pullout passage is configured by the second passage.

6. The tire vulcanization mold according to claim 5 wherein a width of the second passage is larger than a width of the first passage as viewed in a plan view.

7. The tire vulcanization mold according to claim 1, wherein the upper side plate has a first positioning pin, a first positioning hole into which the first positioning pin is fitted is formed in the upper bead ring, the lower side plate has a second positioning pin, a second positioning hole into which the second positioning pin is fitted is formed in the lower bead ring, and the first positioning pin and the second positioning pin are disposed at different positions in a radial direction.

* * * * *